Aug. 28, 1934.  F. C. HIGGINS  1,971,817
GEAR SHIFT CONTROLLING MECHANISM
Filed Nov. 19, 1930   8 Sheets-Sheet 1

Fig.1

Inventor
Frank C. Higgins
By his Attorneys

Inventor
Frank C. Higgins
By his Attorneys

Patented Aug. 28, 1934

1,971,817

UNITED STATES PATENT OFFICE 1,971,817

GEAR SHIFT CONTROLLING MECHANISM

Frank C. Higgins, Minneapolis, Minn.

Application November 19, 1930, Serial No. 496,674

31 Claims. (Cl. 74—334)

My present invention relates to gear shift controlling mechanism and is in the nature of an improvement on or refinement of the gear shift mechanism disclosed and broadly claimed in my prior Patent No. 1,416,466 of date May 16, 1922. My said prior patent provides an improved gear shift controlling mechanism including a select lever or element adapted to be pre-set for any one of several speeds forward or reverse, combined with automatic selecting devices which, by a certain movement of the clutch lever or pedal, will automatically shift the transmission gear for the speed or function predetermined by the setting of the said selecting lever. Said controlling mechanism was especially designed and adapted for use in connection with transmission mechanism of the selective sliding gear type such as found in general use in connection with automobiles or motor propelled vehicles driven by internal combustion engines.

My present invention, in its preferred or complete embodiment, includes or involves the above noted features of my prior patent incorporated in modified mechanism but it also includes additional, and highly important novel features. In the mechanism disclosed in my prior patent, the pre-setting of the selecting lever can take place at any time while the driving clutch is engaged and its setting could be changed at any time while such clutch was engaged, but no provision was made whereby the setting or resetting of the selecting lever could take place while the driving clutch was released. It has been found in practice that it is highly important that a scheme should be devised or provided whereby the change in the setting or resetting of the selecting lever can be also made when the clutch is released. Provision for this last noted important operation is made in the present speed-change or gear shift mechanism and constitutes a salient feature of my present invention. Other highly important features whereby the operation is facilitated will appear in the description of the mechanism which is made the subject-matter of the present application.

In the accompanying drawings which illustrate said invention, like characters indicate like parts throughout the several views.

Referring to the drawings:

Fig. 2ª is a detail in section on the line 2ª—2ª of Fig. 2;

Referring first particularly to Figs. 1, 2, 4, 5 and 6, and noting the parts that are standard or usually found in present automobiles, the numeral 23 indicates the chassis frame, the numeral 24 the engine block, the numeral 25 the automobile body, the numeral 26 the floor boards in front of the driver's seat, the numeral 27 the steering post, the numeral 28 the steering wheel, the numeral 29 the brake lever, the numeral 30 the clutch lever, the numeral 31 the clutch casing, and the numeral 32 the transmission casing.

Figure 5:
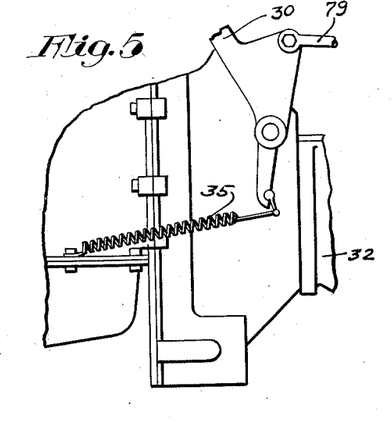
Fig. 5 is a fragmentary view showing in full side elevation the clutch casing and a portion of the clutch lever.
Figure 6:
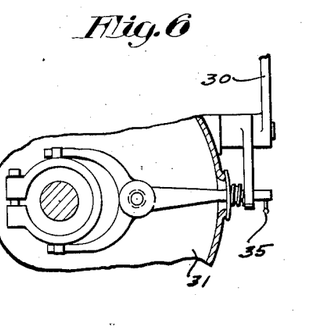
Fig. 6 is a fragmentary section taken on the line 6—6 of Fig. 4.

Within the clutch casing 31 is the customary clutch mechanism 33, as shown of the single plate type and involving the standard spiral clutch spring 34 which, acting in the usual way, normally holds the clutch engaged and presses the clutch lever rearward or upward toward the driver. In Fig. 5, the numeral 35 indicates the usual spring anchored to the engine block and to a lower end projection of the clutch lever 30. This spring 35 does not, of course, interfere with the controlling action of the clutch spring 34, but simply takes up slack and prevents rattling of the clutch lever.

Within the transmission casing 32 are the transmission gears 36. My improved gear shift controlling mechanism is applicable especially to any and all transmission mechanism of the selective sliding gear type, but in the drawings I have illustrated the same as designed for application to transmission mechanism of the above type arranged for what is designated as neutral, high, intermediate, low, reverse and low-low, the latter expression meaning extremely low speed such, for example, as incorporated in transmission mechanism such as found in the present commercial Graham-Paige automobiles and frequently designated as four-speed transmissions to distinguish the same from the more common three-speed forward and reverse.

Figure 4:
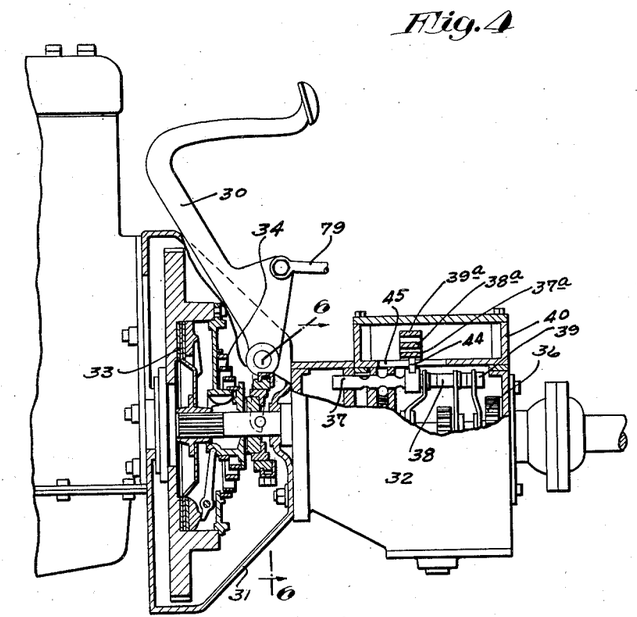
Fig. 4 is a side elevation with some parts sectioned showing the driving clutch, the clutch pedal and parts of the transmission mechanism.
Figures 7, 8, 9:
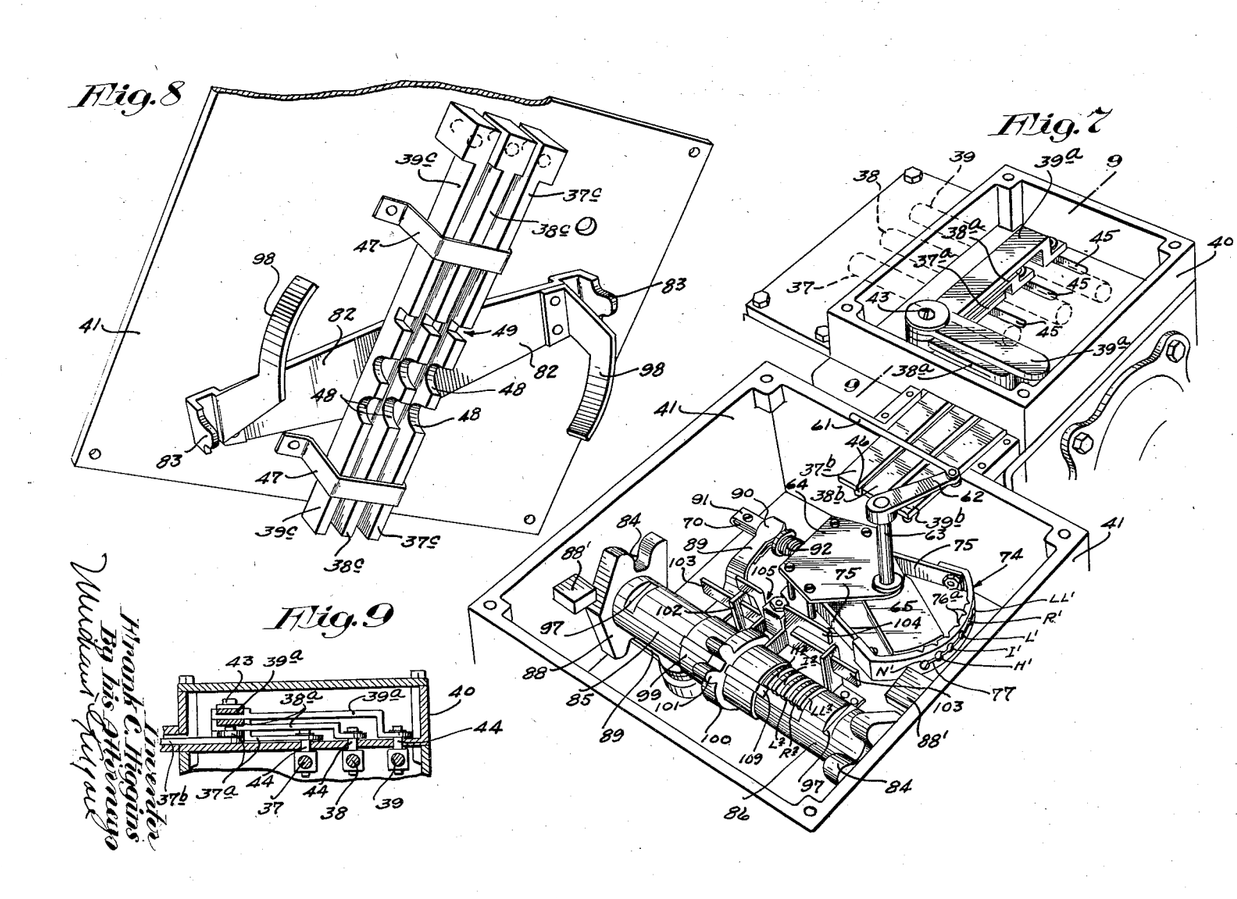
Fig. 7 is a perspective showing those portions of the gear shift mechanism that are contained within casings arranged to be located just below the floor board of an automobile body, some parts being removed.
Fig. 8 is a perspective looking at the under side of the mechanism removed from the larger gear case of Fig. 7.
Fig. 9 is a section taken on the line 9—9 of Fig. 7.

The gear shifting device of such four-speed transmission mechanisms, as is well known to those familiar with the same, include sliding gear shifting plungers or rods 37, 38 and 39, which, as shown by full lines in Figs. 4 and 9 and by dotted lines in Fig. 7, are in parallel arrangement mounted to slide in suitable bearings within the casing 32.

In the present automobile, the four-speed forward and reverse transmission mechanism is provided with the well-known hand-operated shift lever (not of course used in the present arrangement) which has changeable shifting engagement with the several shifter rods 37, 38 and 39 and accomplishes the various gear shifting functions as follows:

For a neutral gear, said rods 37, 38 and 39 will be positioned as shown in Figs. 4 and 7. Forward movement of the plunger 37 from neutral sets the transmission gears for high speed and rearward movement of said plunger sets the gears for intermediate speed. Forward movement of plunger 38 sets the gears for low speed while rearward movement of said plunger sets the gears for reverse. Forward movement of plunger 39 from neutral sets the gears for low-low or extremely low speed, but rearward movement of said rod 39 beyond neutral performs no useful function and is not provided for.

My improved gear shift controlling mechanism makes its attachment to said plungers 37, 38 and 39 preferably through connections that convert the longitudinal or front to rear movements of the said shifter rods from a movement transversely of the automobile. For convenience and as shown, the vital moving parts of the controlling mechanism are contained within two box-like casings 40 and 41, the former of which is conveniently applied on the top of the transmission casing 32 while the latter is shown as supported from the frame 23 by a supporting bracket or plate 42. Both of said casings 40 and 41 are below the floor board of the car. Within the casing 40 are three bell-crank levers $37^a$, $38^a$ and $39^a$ mounted on a common pivot 43, see particularly Figs. 7, 9 and 10 and connected respectively to the shifter rods 37, 38 and 39 by wrist pins 44 that work through slots 45 in the plate that forms the bottom of the casing 40 and the top of the casing 32.

Figure 12:
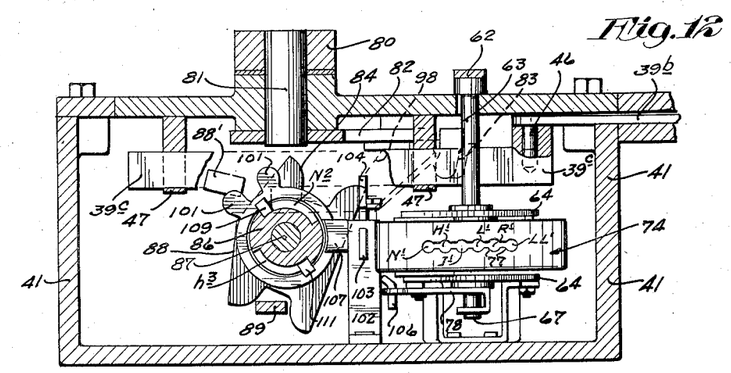
Fig. 12 is a section taken on the line of 12—12 of Fig. 10.

Mechanism for selectively operating the gear shifting plungers 37, 38 and 39 is located in the casing 41 and to render said shifting plungers selectively subject to said mechanism in the casing 41, extension bars $37^b$, $38^b$ and $39^b$ are connected, respectively, to the bell cranks $37^a$, $38^a$ and $39^a$ and are extended into said casing 41. These extension bars $37^b$, $38^b$ and $39^b$ are each preferably provided with detachable rack toothed bars or sections $37^c$, $38^c$ and $39^c$, see particularly Figs. 8, 10 and 12. The detachable connection between the bars $37^b$, $38^b$ and $39^b$ and their respective rack members $37^c$, $38^c$ and $39^c$ are shown as made by dowell pins 46 on the former that engage seats in the latter, as best shown in Figs. 8 and 12. Rack bars $37^c$, $38^c$ and $39^c$ are supported for sliding movements transversely of the automobile in hanger brackets 47 secured to the top plate of the casing 41, and said bars on their under sides are provided with rack teeth forming notches 48 and with lock notches 49.

With the statement that the shifting plungers 37, 38 and 39 will be given their gear-shifting movements for neutral, high, intermediate, low reverse and low-low from movements imparted respectively to the rack bars $37^c$, $38^c$ and $39^c$, I will now trace the selecting and controlling mechanism from the so-called selecting lever referred to in the introduction hereto back through and to the said rack bars $37^c$, $38^c$ and $39^c$.

The selecting lever 50 co-operates with and is pivotally connected to a latch segment 51, the hub of which surrounds and is rigidly secured to the upper portion of the fixed steering post 27. This lever and segment are located just below the steering wheel 28 where the projecting end of the lever is within easy reach of the operator. Latch segment 51 is provided with peripheral notches (preferably V-shaped) marked N for neutral, H for high, I for intermediate, L for low, R for reverse and LL for low-low. Segment 51 on its inner edge is provided with an offset thin flange 52 and lever 50 is provided with a depressible stop button 53 that normally stops against the shoulder of flange 52 but will clear the same when depressed, thereby permitting lever to be moved to positions for reverse and low-low. Lever 50 is also provided with a spring-pressed latch element in the form of a ball 54 that will engage with the V-shaped peripheral notches of latch segment and hold lever 50 in any functioning position in which it may be set with such security that it may be readily moved by hand power applied to the free end of said lever, but will prevent said lever from being moved by any such forces as will be transmitted to the lever backward from the control mechanism.

Figures 2, 2A, 3:
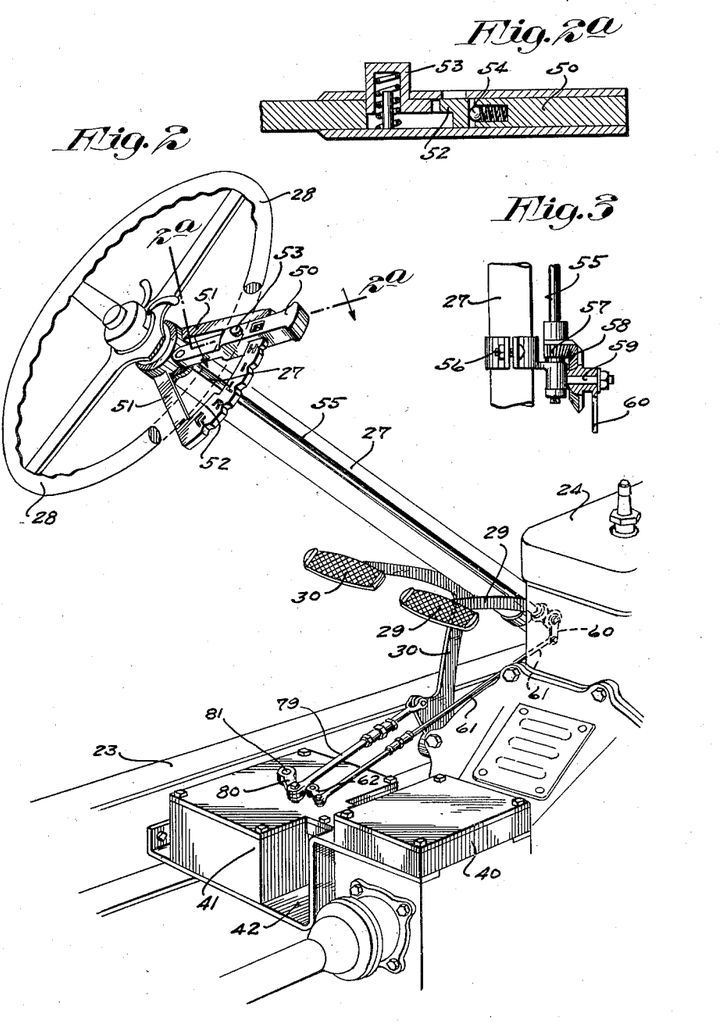
Fig. 2 is a view corresponding to Fig. 1 but with the flooring and body of the automobile removed so as to expose housings containing mechanism of the improved gear shift mechanism.
Fig. 3 is a fragmentary detail partly in elevation and partly in section showing a gear connection between the shaft of the selecting lever and a coupling rod extended to a certain part of the gear shift mechanism.
Figure 22:
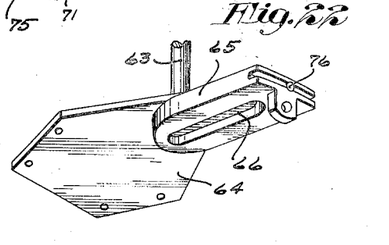
Fig. 22 is a perspective looking upward at the upper so-called cam block of the selecting mechanism showing also a lug or plate to which it is pivoted.
Figure 23:
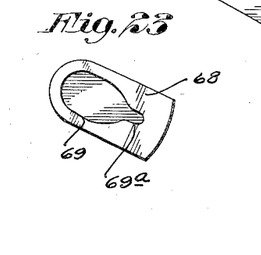
Fig. 23 is a detail in plan of the so-called secondary cam block.

Selecting lever 50 is secured to the upper end of a rock shaft 55, the lower end of which is journaled in a bearing bracket 56, see particularly Fig. 3, secured on the post 27 and provided with a segmental bevel pinion 57 that engages a bevel gear 58 journaled on a stud 59 projected from said bracket 56. The hub of gear 58 is provided with a short depending crank arm 60 that is connected by a connecting rod 61 to a short crank arm 62 on the upper end of a short upright shaft 63. Shaft 63 is extended through the top of casing 41 and is journaled in the upper plate of a bearing 64 that is rigidly secured to the bottom of said casing, see particularly Figs. 2, 7, 10 and 19. A primary selecting element herein designated as a primary cam block 65 is rigidly secured to the lower end of shaft 63 and works immediately below the plane of the top plate of bracket 64. On its under side, primary cam block 65 is provided with a radial groove or cam pin guide-way 66, best shown in Figs. 19 and 22. Located in axial alignment with shaft 63 and journaled in the lower plate of bracket 64 is a trunnion or short shaft section 67 to the upper end of which is secured a secondary selecting element herein designated as the secondary cam block 68. This cam block 68 on its upper face underlying more or less the groove 66 of primary cam block 65 is formed or provided with a wide groove or cavity 69 that affords a pin-engaging cam surface and terminates at its outer extremity in a narrow neck portion 69$^a$ best shown in Fig. 23.

Working with freedom for endwise and lateral movements between the upper and lower plates of the bracket 64 is a thrust bar plunger 70. The forward end of this thrust bar 70 works between the above noted primary and secondary cam blocks and is provided with a cam pin or stud-like projection 71, the upper end of which works in the groove 66 of primary cam block 65 and lower end of which works in the cam-forming groove or recess 69—69$^a$ of lower cam block 68. The pin 71 also pivotally connects to the front end of thrust bar 70 a lock pin 72 which, close to the periphery or free end portions of cam blocks 65 and 68, is notched at top and bottom to form a narrow or flattened portion 73.

The free ends of cam blocks 65 and 68 work close to a lock segment 74 which, as shown, is rigidly secured to bracket 64 by arms 75, see particularly Figs. 7, 10, 12 and 20. This lock segment 74 is provided with lock pin passages or perforations of a diameter to quite freely pass the lock pin 72 therethrough when the latter is aligned with any thereof. Said pin passages in said segment correspond in their number, positions and functions to the above noted several positions of the selecting lever 50. Hence the perforations just noted are indicated in their corresponding relations to the notches in segment 51 with the same characters with the prime marks added thereto.

Primary cam block 65 at its free end is provided with a spring-pressed latch ball 76 that engages with latch notches 76$^a$ formed in the inner edge flange of lock segment 74 in positions corresponding to the above noted lock pin passages in said lock segment 74. Here it should be noted that as a highly important feature, all of the lock pin passages $N^1$, $H^1$, $I^1$, $L^1$, $R^1$ and $LL^1$ are connected by narrow channels 77 that are not deep enough to permit the body of the lock pin 72 to move laterally therethrough but only deep enough to permit the reduced portion 73 of said lock pin to pass from a position of alignment with the one pin passage to the other.

This connection of the pin passages as will hereinafter more fully appear, is a simple means of accomplishing one of the primary objects of the present invention, to wit: the capability in the shift mechanism for changing the position of the selecting lever or primary selecting element while the driving clutch of the automobile is released. The trunnion 67 of lower cam block 68 is provided with a short crank arm 78 shown in Figs. 10, 12, 19, 20 and 21.

Figure 13:
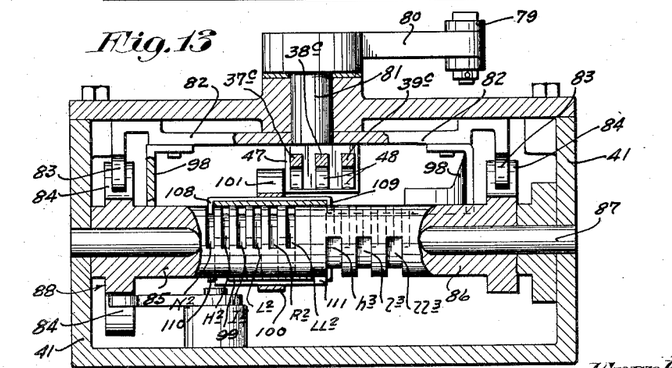
Fig. 13 is a section taken on the line 13—13 of Fig. 10.

In carrying out my invention, clutch lever 30 is connected by a connecting rod or link 79 to a short arm 80 secured on the upper end of a short shaft 81 that is journaled in a bearing formed on the top plate of casing 41, see particularly Figs. 2, 12 and 13. To the lower end of shaft 81 close to the top plate of said casing 41 is intermediately secured a lever-acting oscillatory member 82 (see also Fig. 8) herein designated as a rocker. This rocker, at its opposite ends is provided with depending lugs or gear acting teeth 83 that are engageable with gear-acting segments 84 formed on and projecting upwardly from the outer ends of a pair of axially aligned tumblers 85 and 86 which, as shown, are of cylindrical form and are mounted to oscillate on a fixed shaft 87, the ends of which are secured in the sides of the casing 41. The outer end of tumbler 85 is also provided with a depending gear-acting segment 88 that engages one arm of a bell-crank lever 89 that is pivoted to the bottom of the casing 41, the other arm of said bell-crank, as shown, having a bifurcated head 90 that embraces the projecting end of thrust bar 70 and bears normally against shoulders shown as afforded by a U-shaped clip 91, see particularly Figs. 7 and 19, secured on the end of said thrust bar. A coiled spring 92 is placed around the thrust bar 70 and is compressed between a shoulder 70$^a$ and a washer 70$^b$, which shoulder is rigid on said thrust bar and which washer is loose but pressed against the head 90.

Figures 14, 15, 16, 17, 18:
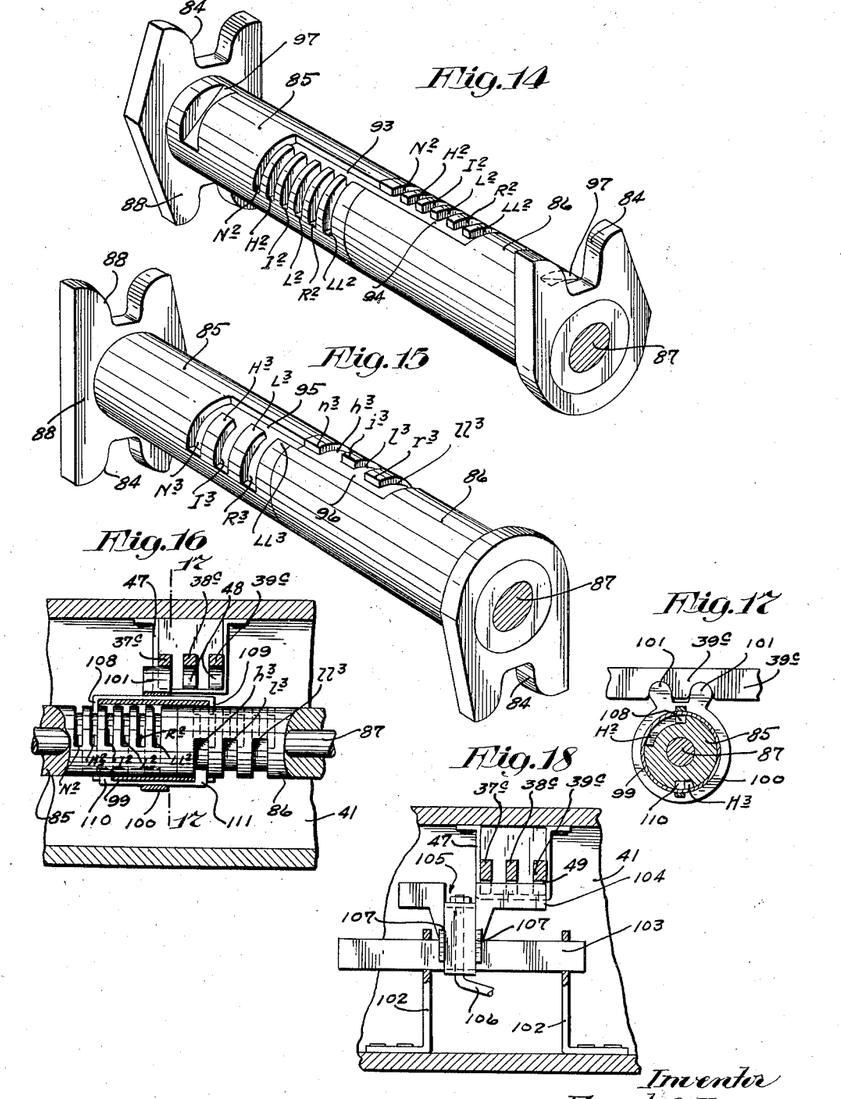
Fig. 14 is a perspective showing the aligned selecting tumblers looking down or at the tops thereof.
Fig. 15 is a view corresponding to Fig. 14 but showing the tumblers turned upside down.
Fig. 16 is a section taken on the line 16—16 of Fig. 10, parts being broken away.
Fig. 17 is a fragmentary section taken through certain of the parts on the line 17—17 of Fig. 16.
Fig. 18 is a fragmentary section taken on the line 18—18 of Fig. 10.

Tumblers 85 and 86 in their upper surfaces are provided respectively with longitudinal channels 93 and 94 and in their under surfaces with longitudinal channels 95 and 96. Normally, that is when the driving clutch is engaged, channel 93 will be circumferentially out of alignment with channel 94 and channel 95 will be circumferentially out of alignment with channel 96. Tumblers 85 and 86 are provided with segmental circumferentially extended retaining grooves $N^2$, $H^2$, $I^2$, $L^2$, $R^2$, and $LL^2$. The said retaining grooves just noted extend circumferentially in one direction from the channel 93 of tumbler 85 and in the opposite direction from channel 94 of tumbler 86, as best shown in Fig. 14. Here it should be stated that the above noted retaining grooves are spaced longitudinally of the tumblers to correspond to the quite similarly designated notches of latch segment 51 and plunger passages of lock segment 74.

As best illustrated in Fig. 15 which shows the tumblers 85 and 86 rotated so that their normal bottoms are upward, tumbler 85 is provided with longitudinally spaced segmental grooves $N^3$, $I^3$, and $R^3$, and tumbler 86 is provided with similar grooves $h^3$, $l^3$ and $ll^3$. The grooves just noted extend in tumbler 85 circumferentially in one direction from channel 95 while the grooves in tumbler 86 extend circumferentially in the opposite direction from channel 96. The above noted grooves form in tumbler 85 driving lugs $H^3$, $L^3$ and $LL^3$ and form in tumbler 86 driving lugs $n^3$, $i^3$ and $r^3$. The just above noted grooves extended from channels 95 and 96 of tumblers 85 and 86, are twice as wide as the grooves in the upper portion of said tumblers and are spaced twice as far apart for an important reason which will appear in the description of the operation.

Tumblers 85 and 86 are formed near their ends with flat surfaces 97 that normally, or when the driving clutch is engaged, are engaged by segmental retaining flanges 98 carried by the ends of rocker 82. When the flanges 98 engage the flattened surfaces 97, said rockers will be held in positions shown in Figs. 10, 11 and 12 with channel 93 circumferentially out of alignment with channel 94 and with channel 95 circumferentially out of alignment with channel 96.

Figure 10:
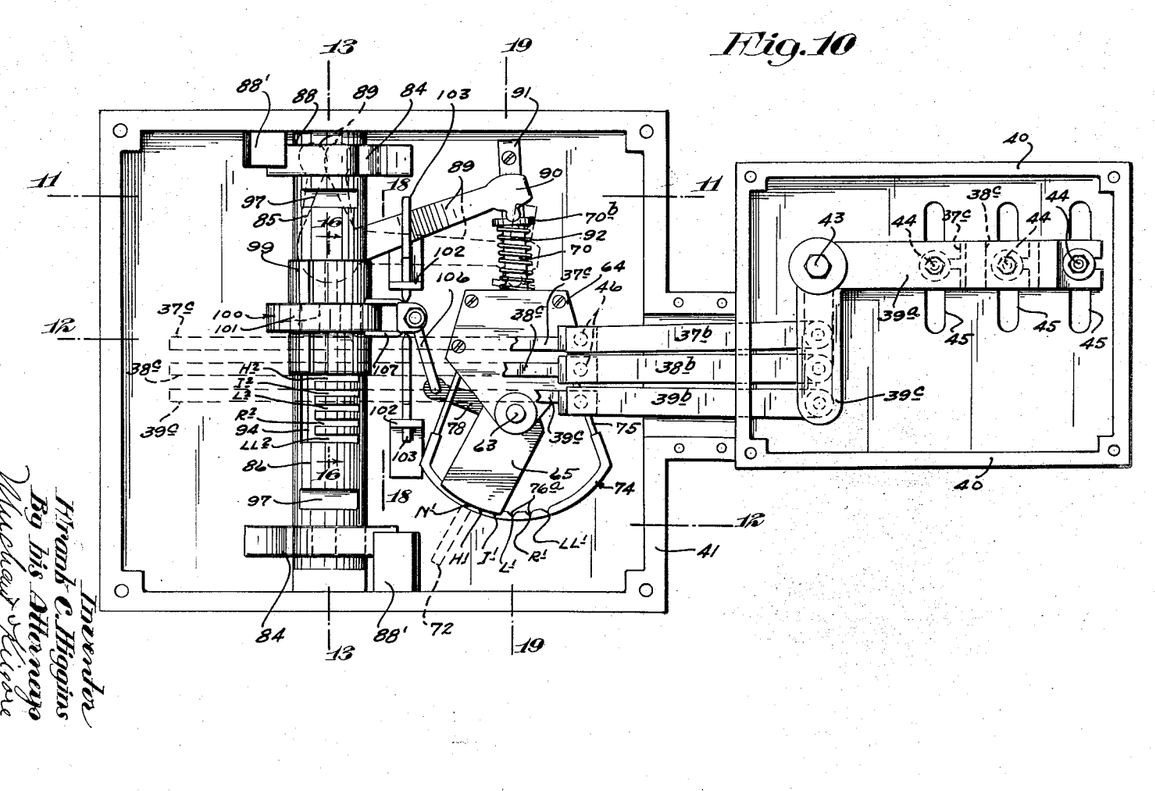
Fig. 10 is a plan view of substantially the same parts that are shown in Fig. 7.
Figure 11:
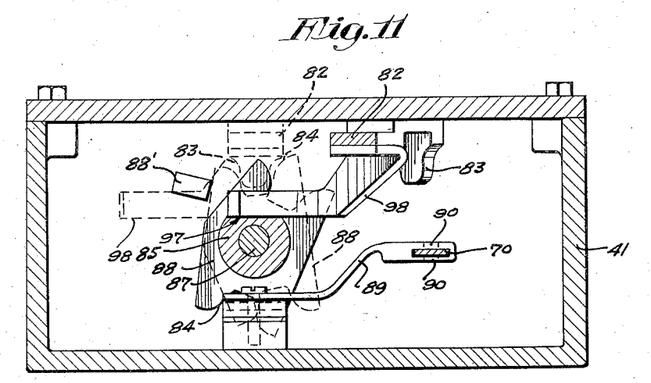
Fig. 11 is a section taken on the line 11—11 of Fig. 10.

Working slidably on the grooved end portions of tumblers 85 and 86 is a so-called shifter head in the form of a sleeve 99 provided with one or more teeth for action on the rack-acting teeth 48. In the particular construction shown, said sleeve 99 has a circumferentially extended collar 100 formed with two teeth 101, see particularly Figs. 10, 12, 13, 16 and 17. Mounted to slide adjacent to the tumblers 85 and 86, parallel therewith in bearings 102, is a sliding bar 103 to which is secured a flat bar-like member formed with a shipper bar lock flange 104 and with a release passage 105, see particularly Fig. 18. Sliding bar 103 is connected by a link 106, see particularly Figs. 10 and 18, to the arm 78, which it should be remembered, is secured to the lower end of short lower shaft 67, that carries the lower or secondary selecting block. Sliding bar 103, see particularly Figs. 10 and 18 is provided with projecting shipper lugs 107 best shown in Figs. 10 and 18, that embrace the collar 100 of shifter head 99 and cause shifter head 99 to be given the same sliding movements as bar 103 and keep teeth 101 always in alignment with the release passage 105.

For co-operation with the channels 93 and 94, of tumblers 85 and 86, shifter head 99 is provided with inwardly projected longitudinally spaced retaining lugs 108 and 109; and for co-operation with the bottom channels 95 and 96 of said tumblers 85 and 86 and with the notches and driving lugs associated with said channels 95 and 96, the sleeve of said shifter head is provided with inwardly projecting driving lugs 110 and 111.

The structure just noted is best illustrated in Figs. 13, 16 and 17. The peculiar relations as well as the functions of the grooves, tumblers, shifter head and co-operating parts can be best made clear in the description of the operation of the complete gear shift control mechanism.

Figure 19:
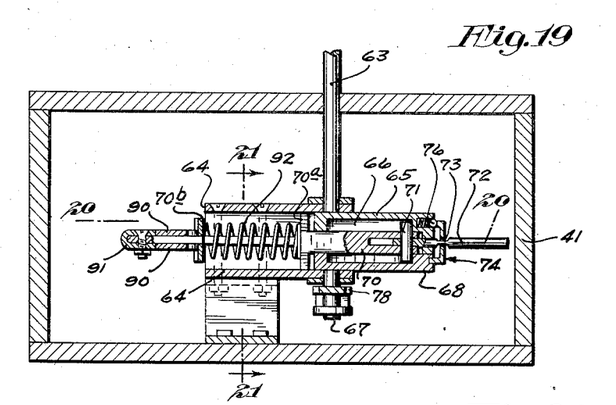
Fig. 19 is a section taken on the line 19—19 of Fig. 10.
Figure 20:
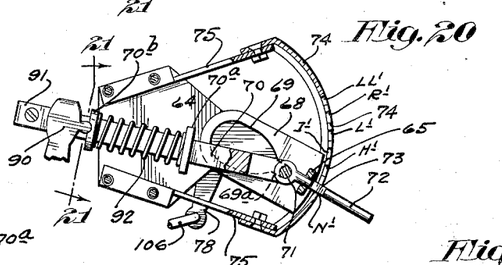
Fig. 20 is a horizontal section taken through certain of the parts on the line 20—20 of Fig. 19.
Figure 21:
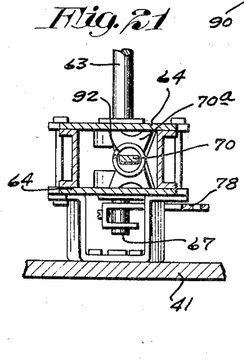
Fig. 21 is a section taken on the line 21—21 of Figs. 19 and 20.

Before summarizing the operation of the complete gear shift controlling mechanism, it is thought well to call or recall to the reader's attention the following several facts. When the device is assembled, the parts shown in Fig. 8 will be turned down and secured to the top of the casing 41 so that the flanges 98 will be in position for engagement with the flattened surfaces 97 of the tumblers 85 and 86, and the teeth 83 will be brought in position to engage the gear segments 84 of the tumblers when rocker 82 is oscillated. Fig. 10 shows the positions of the parts when the driving clutch 33 is engaged and Figs. 19 and 20 show the positions of the parts when the driving clutch is released by an extreme clutch-releasing movement beyond that necessary to actually release the clutch and which position is herein referred to as an abnormal clutch-releasing position.

Operation

Regardless of the position in which the selecting lever 50 is set, the driver can move the clutch 33 far enough to release the clutch without in any way acting upon the controlling mechanism, except to give rocker 82 a slight oscillatory movement; and even if the clutch lever should be moved to its extreme or so-called abnormal clutch-releasing position, the relation of the gears will not be changed unless, since a previous clutch-releasing movement, the position of selecting lever 50 has been changed. For example, if the selecting lever is set in a neutral position, as indicated in Figs. 1 and 2, of the drawings, and clutch lever 30 is given an extreme or abnormal clutch-releasing movement, rocker 82 will be oscillated, thereby carrying the retaining segments 98 out of engagement with flattened surfaces 97 of tumblers 85 and 86, and bringing teeth 83 into engagement with gear segments 84 of tumblers 85 and 86 imparting reverse oscillatory movements to said tumblers until segments 88 come into contact with stop lugs 88' at which time channels 95 and 96 of said tumblers are aligned.

Also the above noted movement of the rocker 82 causes gear segment 88 of tumbler 85 to engage the short arm of bell-crank 89 moving said bell-crank in a direction to compress spring 92 (see Fig. 10) and this will cause cam pin 71 of plunger 70 to run down the slots of primary cam block 65 and secondary cam block 68; but such operation will not move secondary cam block 68 which was already in alignment with cam block 65 and hence when the clutch 33 is again engaged, the various parts will go back to normal position and the shifter head 99 will not be given axial movement, but will remain in its normal position shown in Fig. 10 with its teeth 101 out of alignment with each and all of the rack bars 37ᶜ, 38ᶜ and 39ᶜ.

Figure 1:
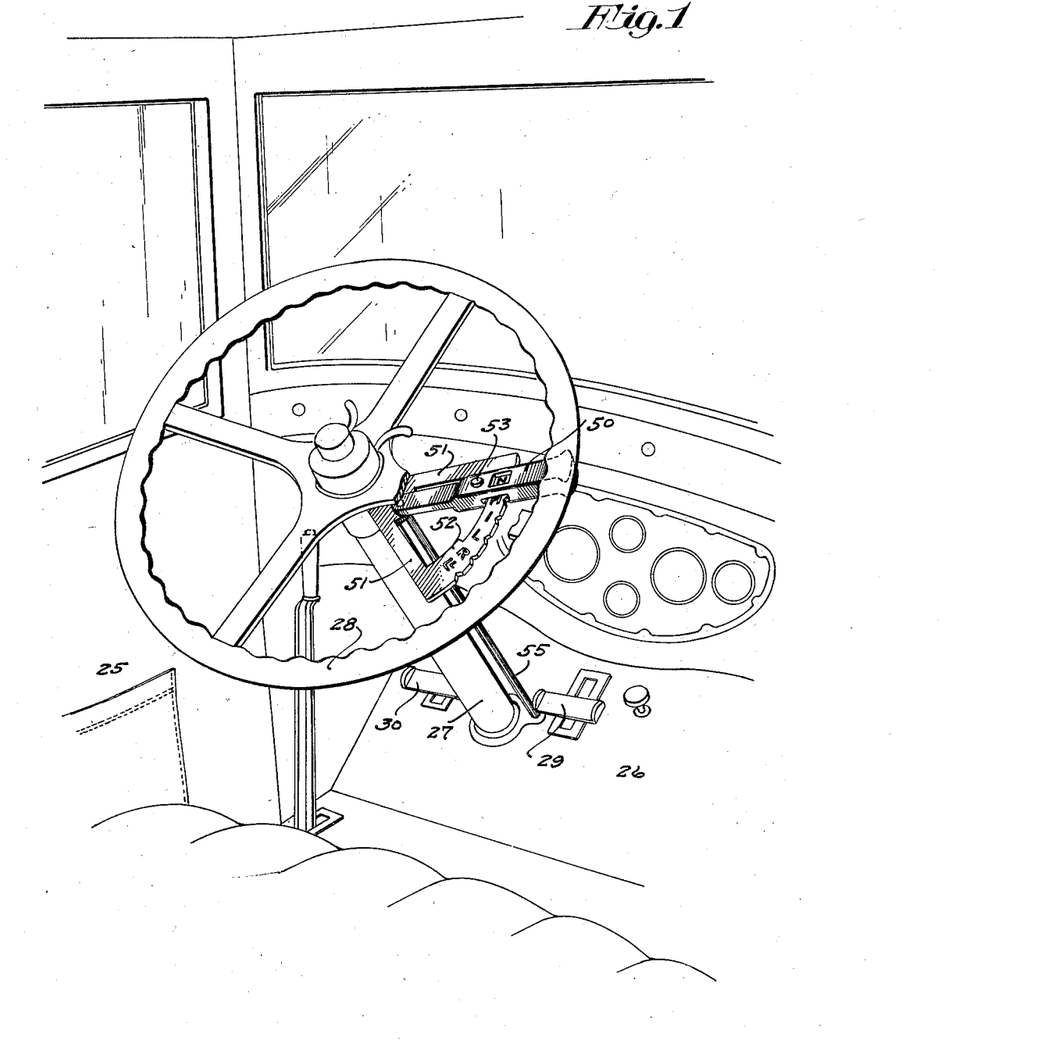
Fig. 1 is a fragmentary perspective illustrating the application of the improved gear shift mechanism to an automobile and particularly showing the selecting levers and wheel-equipped steering post to which said lever and its latch segment are applied.

All the time that the selecting lever is in neutral position shown in Figs. 1 and 2, shipper lock flange 104 holds the several rack bars 37ᶜ, 38ᶜ and 39ᶜ against movement. When in the said neutral position of the selecting lever, shifting head 99 will be so positioned that its lug 110 will be aligned with slot $N^3$ of tumbler 85 and its lug 111 will be aligned for engagement with driving lug $n^3$ of tumbler 86, and hence said head will be oscillated when the channels 95 and 96 of tumblers 85 and 86 are turned into alignment, but such movement will perform no function whatever, inasmuch as the gear teeth 101 are then out of the plane of action on all of the rack bars.

For second illustration, assume that prior to a clutch-releasing movement of lever 30, selecting lever 50 has been set at notch H which is one notch distant on segment 52 from above noted neutral position. When said selecting lever is thus set for "high", primary selecting block 65 will be oscillated so that its plunger 72 will be aligned with notch $H^1$ of segment 74 and will be yieldingly but quite securely held in that position by engagement of spring-pressed ball 76 in one of the notches 76ᵃ of segment 74. When lever 50 and primary block 65 are thus pre-set, normal clutch-releasing movements will not bring the rocker 82 into the above described action and no shifting of gears will take place and, moreover, the driver can at any time prior to an abnormal clutch-releasing movement, change the setting of the selecting lever for any one of the other possible positions such as neutral intermediate, low, reverse, or low-low.

With the selecting lever set for "high" as stated, when the clutch is given an abnormal clutch-releasing movement, the movement of bell-crank 89 against spring 92 will immediately impart enough outward movement to lock pin 72 to engage the same in notch H¹ of lock segment 74, thereby positively locking primary cam block 65 against oscillatory movement. Inasmuch as the secondary cam block 68 is then out of alignment with cam block 65, the further movement of plunger 70 and lock pin 72 will be temporarily intercepted and spring 92 will be compressed, storing up force to complete the movement of said plunger and lock pin later on. The intercepted movement of plunger 70 and lock pin 72 just noted is caused by the fact that secondary cam block 68 cannot move into alignment with block 65 until the two tumblers 85 and 86 are turned into positions shown in Figs. 14 and 15, in which channels 93 and 95 of tumbler 85 are aligned respectively with channels 96 and 94 of tumbler 86. For the time being, ignore the action of the lugs 108 and 109 of shifter head 99 and accept the statement that as soon as the tumblers are turned into position to cause channels 95 and 96 to be aligned, lugs 110 and 111 of said shifter head will be released and permitted to slide down in channels 95 and 96; and this releases spring-pressed plunger 70 so that spring 92 will then quickly thrust cam pin 71 into the contracted neck 69ᵃ of secondary cam block 68 causing the latter to move up into alignment with and to be locked to the primary cam block 65. Here it may be noted that when pin 71 is in the contracted neck 69ᵃ, the two cam blocks 65 and 68 will be locked together so that at any time, when the clutch is released by manual manipulation of lever 50, any speed or neutral can be selected. The movement of secondary cam block 68 just noted is just sufficient to move shifter head 99 far enough to bring its teeth 101 into the plane of rack bar 37ᶜ, at the same time bringing release notch 105 into alignment with said bar 37ᶜ. Also said movement of the shifter head 99 brings its lug 110 in alignment with driving lug H³ of tumbler 85 and its lug 111 into alignment with groove h³ of tumbler 86.

It will thus be noted that the teeth 101 of shifter head 99 are slid into engagement with the teeth of rack bar 37ᶜ while the driving clutch is in an extreme or abnormal release position, but that as yet no shifting of the gears has taken place.

When the foot pressure is removed from clutch lever 30 and driving clutch 33 under the action of spring 34 is then again engaged, rocker 82 will, of course, be rocked back to its normal position, thereby oscillating the tumblers 85 and 86 back to normal position shown in Figs. 7 and 10. In the particular setting for "high", just noted, it is the tumbler 85 by its return movement that produces the gear shifting action; for under such movement, its lug H³ acts upon lug 110 of shifter head 99, causing gear shift rod 37 to move forward or in position to set the transmission gears for high speed.

In setting the mechanism for other gear shifts, such as intermediate, low, reverse, or low low, the operations produced will be very similar to those already described in connection with the setting for "high". The different settings of selecting lever 50, however, determine the setting of the shifter head 99 following an abnormal clutch-releasing action as follows:

In setting for "intermediate" speed, shifter head 99 will be moved so that its lug 110 will be aligned with release groove I³ of tumbler 85 and its lug 111 will be aligned subject to lug i³ of tumbler 86; but gear teeth 101 will still be positioned for engagement with rack bar 37ᶜ. Under return of the tumblers to normal positions, with the setting just described, tumbler 86 will be the active member and (moving reversely to the tumbler 85) operating through the connections described, will, when the abnormal clutch engaging movement occurs, cause gear shift rod 37 to be moved rearward or reverse to the direction in which it is moved for "high", the position to set the transmission gears for intermediate speed.

In setting for "low" speed, shifter head 99 will be moved so that its lug 110 will be aligned for engagement with lug L³ of tumbler 85 and its lug 111 will be aligned with groove l³ of tumbler 86, and teeth 101 of shifter head will be moved into the plane and positioned for action upon rack bar 38ᶜ. Under return movement of tumblers to normal position with the setting for "low" just described, tumbler 85 will again become the active member and operating through the connections described will, when abnormal clutch-engaging movement occurs, cause shift rod 38 to be moved forward and in the direction in which said rod must be moved to set the transmission gears for "low" speed.

In setting for "reverse", shifter head 99 will be moved or slid axially so that its lug 110 will be aligned with groove R³ of tumbler 85 and its lug 111 will be aligned subject to lug r³ of tumbler 86; but teeth 101 will still be positioned for engagement with rack bar 38ᶜ. Under return of the tumblers to normal position with the setting for "reverse" just described, tumbler 86 will be the active member and operating through the connections described will cause gear shift rod 38 to be moved rearward which is the direction required to set the transmission gears for reverse drive.

In setting for "low-low", or abnormally low speed, shifter head 99 will be moved or slid axially so that its lug 110 will be aligned with and subject to lug LL³ of tumbler 85 and its lug 111 will be aligned with groove ll³ of tumbler 86, and teeth 101 of shifter head will be moved into the plane and positioned for action upon the rack bar 39ᶜ. With this setting for "low-low", under return movement of tumblers 85 and 86, to normal positions tumbler 85 again becomes the active member and operating through the connections described, will cause gear shift rod 39 to be moved forward which is the direction of said rod required to set the transmission gears for "low-low".

From what has been said it should be understood that the gear teeth 101 and clearance gap 105 are in width each equal approximately to two steps of sliding movement of the shifter head 99 so that the said teeth 101 will act upon the same rack but in two different positions and gap 105 will afford a clearance or release for one rack bar at a time but in two different positions. Of course, it is always the rack bar subject to movement from the shifter head that is released by the gap 105 and all of the rack bars not subject to movement of shifter head for the particular setting are locked against movement by the lock or retaining flange 104 engaging in notches 49.

If the movements of gear shift rods 37, 38 and 39 for the different gear shifts were the same in each instance, then the working face of lugs H³, L³, and LL³ of tumbler 85 and lugs n³, i³, and r³ of tumbler 86 could all be spaced in alignment for the same distance from the opposite walls of channels 95 and 96 and the release of the shifter head for the axial movements described and at the time stated, would be properly controlled by the said lugs. As a matter of fact in standard gear shifts, now on the market, the said rods 37, 38 and 39 are given axial or longitudinal movement varying in extent for the different gear shift actions. For example, in the particular gear shift to which the controlling mechanism is applied, rod 37 travels a one-half inch forward for "high" speed, and one-half an inch rearward for "intermediate" speed; rod 38 travels an inch forward for "low" speed and an inch backward for "reverse" speed; and rod 39 travels an inch forward for "low-low" speed.

Hence the lugs H³ of tumbler 85 and i³ of tumbler 86 are cut back farther than the other driving lugs and this, while it does not positively prevent the said lugs from performing the escape or release function, would render the release somewhat irregular under certain conditions and hence the provision of lugs 108 and 109 and co-operating grooves N², H², I², L², R² and LL² of tumblers 85 and 86. These grooves and the flanges between the same terminate in axial alignment with walls of the channels 93 and 94 and hence produce the releasing action of the shifter head just as the channels 93 and 94 are brought into alignment by movement of the tumblers 85 and 86 to abnormal release position shown in Figs. 14 and 15. As already stated, the grooves N², H², I², L², R² and LL² are spaced half the distance of the spacing of the grooves N³, I³ and R³, of tumbler 85 and of grooves h³, i³ and ll³ of tumbler 86.

Figs. 19 and 20 show the position of lock pin 72 when the driving clutch is in full or abnormal release position and at such time as already indicated, the primary cam block 65 by manipulation of the selecting lever 50 can be set in any desired position inasmuch as the flattened portion 73 of said lock pin will then move freely through the gaps 77 that connect the several lock perforations N¹, H¹, I¹, L¹, R¹ and LL¹. Of course, said cam block 65 can also be moved by manipulation of the selecting lever when the driving clutch is engaged, because then lock pin 72 is retracted completely out of the lock segment 74.

It is important, however, to note that the extent of the contracted portion 69ª of secondary cam block 68 is such that cam pin 71 will be given an initial engagement with said contracted portion before lock pin 72 is moved outward quite far enough to bring its flattened portion 73 into position for movement from the one to the other of the lock perforations 74; and thus insures positive locking of the two so-called cam blocks 65 and 68 together while primary cam block 65 is still positively locked by lock pin 72; and conversely, under return movement of clutch-operating pedal from abnormal release position lock pin 72 again engages the aligned lock perforation of segment 74, and the initial oscillatory movement of tumblers 85 and 86, will lock the shifter head 99 against axial movement, and will take place before cam pin 71 leaves the neck 69ª of secondary cam block 68. Of course, immediately following disengagement of teeth 83 of rocker 82 with gear segments 84 of tumblers 85 and 86, at the completion of movement of the tumblers back to normal positions, retaining flanges 98 of said rocker again engage the flattened surfaces 97 of said tumblers and secure the latter against accidental oscillatory movements.

From the foregoing it follows that the lock pin 72 will lock the primary selecting element against movement from its pre-set position during the time that the gears are being shifted from one position to another. This is very important because it prevents clashing of gears and interference with the intended functions and prevents the performing of some functions not intended.

In the arrangement illustrated, wherein the various parts are placed within tight housings or casings, it is feasible and intended that the various moving parts should be arranged to work in light grease or oil, which will practically eliminate wear of the parts.

From the foregoing, the following facts appear, to wit: it is the initial movement of the spring-pressed clutch-setting mechanism that causes shifting of gears into mesh for change of speed or reverse. It is the movements of the tumblers 85 and 86 from channel aligned positions back to normal positions that shifts the racks and hence the gear shift rods 37, 38 and 39 from their normal positions shown by dotted lines in Fig. 7, and causes the latter to shift the transmission gears into mesh and, of course, it is the movement of said tumblers from normal to channel aligned positions that brings the said rods 37, 38 and 39 back to "gear-out-of-mesh" position shown by dotted lines in Fig. 7. Moreover, it is oscillatory movement of the tumbler 85 acting on shifter head 99 from channel aligned position back to normal that causes forward movements of the rods 37, 38 and 39 and it is the oscillatory movement of tumbler 86 from channel aligned position back to normal that causes rearward movements of said gear shift rods 37 and 38.

Broadly considered, the so-called gear shift rods 37, 38 and 39 are primary gear-shifting elements and the so-called primary and secondary cam blocks 65 and 68 are co-operating primary and secondary elements movable, the former in advance of the other combined with means for causing the secondary element to follow up and assume a position corresponding with that in which the primary element is set. The so-called tumblers, broadly considered, are co-operating intermediate actuating elements which control shifting movements of the so-called shifter head and produce the operative movements of the latter.

The fact indicated in the introduction to the specification that the pre-setting for any gear shift change can be made both while the clutch is engaged and while the clutch is fully released, is highly important and believed to be broadly new in this improved mechanism. It is further important to note that such change in the setting of the gear shift mechanism cannot be made while any of the parts of the gear shift mechanism are in motion. Another important fact found in the operation of the gear shift mechanism is found in the facts that if through carelessness or design the shift lever 50 should be set half way between notches or otherwise improperly set, or if the clutch pedal 30 should not be completely depressed or moved to abnormal clutch releasing position, such actions will cause no harm to the mechanism because they will produce no change and the transmission gears will simply be returned to their previous properly set positions. Obviously, if selecting lever 50 is improperly set in a position between notches, while the clutch is set, pin 72 will not be aligned with any one of the pin passages of segment 74 and hence no movement of the plunger 70 can take place; and if the selecting lever be thus improperly set, when the clutch is in full release, contracted portion 73 of lock pin 72 will be in one of the contracted passages 77 of segment 74 and, moreover, lugs 110 and 111 of shifter head 99 will be partially engaged with lugs on both of the tumblers 85 and 86 and will then lock the said tumblers against return movements.

From the disclosure herein made of what is at present believed to be a preferred form of the gear-shifting mechanism, it, of course, follows that the mechanism particularly described is capable of a large range of modification within the spirit of the invention herein disclosed and within the terms of the appended claims.

It is considered broadly new in this device to provide means whereby the gear-shifting mechanism can be set for change or shift while the clutch is in release. Such an arrangement would permit an elimination of a large part of the mechanism described. For example, such an arrangement would be provided if shafts 63 and 67 were locked together by the means shown or any other means, and the bell-crank 89, spring 92, plunger 70 and cam blocks 65 and 68 were eliminated. The elimination of the parts noted would provide a very simple semi-automatic device permitting, by manipulation of the selecting lever 50, the shifter head 99 to be set in any desired position while the clutch was fully released and for subsequent action under initial clutch-engaging action.

Obviously, the intermediate selecting element herein designated as the shifter head is, in this preferred structure, (which includes the presetting feature), arranged to be given its selective axial movements indirectly from a manually-operated member herein designated as the selecting lever or selecting element. It is also evident that if the presetting feature should be eliminated, the structure could be greatly simplified and said shifter head arranged to be manually and more directly set.

What I claim is:

1. The combination with primary gear-shifting elements and the clutch of a transmission system, of a controlling mechanism therefor including a selecting element adapted to be set in advance and while said clutch is released, and means operative by initial clutch-engaging movement to cause shifting of the transmission gears according to the pre-setting of said selecting element, and at all times to positively lock the gear shifting mechanism against all gear-shifting actions except the one selected.

2. The combination with primary gear-shifting elements and the clutch of a transmission system, of a controlling mechanism therefor including a selecting element adapted to be set in advance both while said clutch is engaged and in release, and means operative by initial clutch-engaging movement to cause shifting of the transmission gears according to the pre-setting of said selecting element, and means operative to lock the primary selecting element while the gear-shifting elements are in operation, but to unlock the primary selecting element during the interval between the shifting out of one speed to the shifting in of another speed.

3. The combination with the primary gear-shifting elements and the clutch of a transmission system, of a control mechanism therefor comprising primary and secondary selecting elements, means for actuating said clutch, means operative to set said primary selecting element in different selecting positions in advance of the gear-shifting action and while said clutch is in full release, and means operative by final clutch-releasing movement to cause said secondary selecting element to follow up said primary selecting element and on initial clutch-engaging movement to cause the gear-shifting action predetermined by the setting of said primary selecting element.

4. The combination with the primary gear-shifting elements and the clutch of a transmission system, of a control mechanism therefor comprising primary and secondary selecting elements, means for actuating said clutch, means operative to set said primary selecting element in different selecting positions in advance of the gear-shifting action, both while said clutch is engaged and in full release, and means operative by final clutch-releasing movement to cause said secondary selecting element to follow up said primary selecting element and on initial clutch-engaging movement to cause the gear-shifting action predetermined by the setting of said primary selecting element, and means operative to lock the primary selecting element while the gear-shifting elements are in operation, but to unlock the primary selecting element during the interval between the shifting out of one speed to the shifting in of another speed.

5. The combination with the primary gear-shifting elements and the clutch of a transmission system, of a control mechanism therefor comprising primary and secondary selecting elements, means for actuating said clutch, means operative to set said primary selecting element in different selecting positions in advance of the gear-shifting action, while said clutch is in full release, and means operative by clutch-releasing movement to lock said secondary selecting element to said primary selecting element and on initial clutch-engaging movement to cause the gear-shifting action predetermined by the setting of said primary selecting element.

6. The combination with the primary gear-selecting elements and the clutch of a transmission system, of a control mechanism therefor comprising primary and secondary selecting elements, means for actuating said clutch, means operative to set said primary selecting element in different selecting positions in advance of the gear-shifting action, both while said clutch is engaged and in full release, and means operative by final clutch-releasing movement to cause said secondary selecting element to follow up said primary selecting element, and on initial clutch-engaging movement to cause the gear-shifting action predetermined by the setting of said primary selecting element, and means operative to lock the primary selecting element while the gear-shifting elements are in operation, but to unlock the primary selecting element during the interval between the shifting out of one speed to the shifting in of another speed.

7. In gear-shifting mechanism for motor-propelled vehicles, the combination with clutch-actuating mechanism adapted to be manually operated in one direction to release the clutch, gear-changing mechanism, connections between said clutch and clutch-actuating mechanism and the gear-changing mechanism, said connections including means providing a limited movement of the clutch-actuating mechanism relative to the gear-changing mechanism in the initial part of the clutch-releasing movement and to render the gear-changing mechanism operative in the initial part of the clutch-engaging movement, and a spring connection with the clutch-actuating mechanism arranged to actuate the same in the direction to apply the clutch, said connections including also means enabling the clutch-shifting mechanism to actuate the gear-changing mechanism in the initial part of the clutch-engaging movement, whereby the clutch-actuating spring is adapted to actuate the clutch to first shift the gears and then apply the clutch and permit the release of the clutch without affecting the gear-shifting mechanism said connections further including a selecting element arranged to be set both while the clutch is engaged and when it is released, to predetermine the subsequent action of said connections on the transmission gears, and means operative to lock the primary selecting element while the gear-shifting elements are in operation, but to unlock the primary selecting element during the interval between the shifting out of one speed to the shifting in of another speed.

8. In gear-shifting mechanism for motor-propelled vehicles, the combination with clutch-actuating mechanism adapted to be manually operated in one direction to release the clutch, gear-changing mechanism, connections between said clutch and clutch-actuating mechanism and the gear-changing mechanism, said connections including means providing a limited movement of the clutch-actuating mechanism relative to the gear-changing mechanism in the initial part of the clutch-releasing movement and to render the gear-changing mechanism operative in the initial part of the clutch-engaging movement, and a spring connection with the clutch-actuating mechanism arranged to actuate the same in the direction to apply the clutch, said connections including also means enabling the clutch-shifting mechanism to actuate the gear-changing mechanism in the initial part of the clutch-engaging movement, whereby the clutch-actuating spring is adapted to actuate the clutch to first shift the gear and then apply the clutch and permit the release of the clutch without affecting the gear-shifting mechanism, said connections further including a selecting element arranged to be set both while the clutch is engaged and when it is released, to predetermine the subsequent action of said connections on the transmission gears; in further combination with means for selectively and positively locking gear change mechanism not subject to the set selecting element and to release gear-shifting mechanism subject to said set selecting element.

9. The combination with the primary gear-shifting elements and clutch of a transmission system, of a gear shift controlling mechanism comprising reversely acting tumblers, clutch-actuating mechanism operative also to impart reverse oscillatory movements to said tumblers, a shifter head movable axially on said tumblers, said tumblers having spaced lugs operative alternately on said shifter head under progressive axial adjustments of the latter to impart oscillatory movements thereto in the one direction or the other required for the progressive gear-shifting actions, means whereby oscillatory movements imparted to said shifter head by said tumblers will correspondingly move said primary gear-shifting elements, said gear shift controlling mechanism further comprising a selecting element arranged to be set in advance to predetermine the axial movements and setting of said shifter head.

10. The combination with the gear-shifting rods of a selecting transmission mechanism, a spring-engaged driving clutch, and a lever with connections for releasing said clutch, of a shifter head mounted for sliding oscillatory movements, the former movement determining the function that it will perform in the gear-selecting action and the latter movement serving to produce the predetermined gear-shifting action, reversely movable tumblers selectively and reversely operative on said shifter head when oscillated, and a selecting element arranged to be variably set in advance, both while said clutch is engaged and while it is in full release and operative to predetermine the axial position of said shifter head and hence the gear-shifting action that will take place under initial movement of said clutch from extreme release position.

11. The combination with primary gear-shifting elements and the clutch of a transmission system, of a controlling mechanism therefor including a selecting element adapted to be set in advance both while the clutch is engaged and in release, and means operative by initial clutch-engaging movement to cause shifting of the transmission gears according to the pre-setting of said selecting element; in further combination with a lock segment adjacent to said selecting element and having lock pin perforations, one for each gear-shifting function, said perforations being connected by contracted passages, a lock pin carried by said selecting element and projectable through the perforations of said lock segment, said lock pin normally being retracted from said segment and having a contracted portion that will move through the narrow channels connecting said perforations when said pin is projected to an extreme position; and connections between said lock pin and the clutch-actuating mechanism operative to retract said lock pin when the clutch is engaged and to impart extreme projecting movement thereto when said clutch mechanism is given final clutch-releasing movement.

12. The combination with the transmission gear shift rods and clutch of a motor-propelled vehicle, of rack bars connected to the respective gear shift rods, reversely oscillatory axially aligned tumblers, a shifter head slidably mounted on said tumblers and having teeth engageable with said rack bars, said shifter head having lugs and said tumblers having alignable channels and reversely extended lug-clearing grooves and lug-forming flanges, a lock bar slidable with said shifter head and normally locking all of said rack bars but having a release notch aligned with the teeth of said shifter head for progressively releasing said rack bars, primary and secondary cam blocks, a lever with connections for pre-setting said primary cam block in position for subsequent gear shift determined by the setting thereof, a plunger operative on said cam blocks to cause the said secondary block to follow up and assume the pre-set position of said primary cam block, a shift connection between said secondary cam block and said shifter head, a spring which, when compressed, tends to move said secondary cam block into alignment with said primary cam block and which when released imparts such movement thereto, and means connected with the clutch-actuating mechanism operative to compress said spring under final clutch-releasing movement, the said tumblers normally holding said shifter head and secondary cam block against movement but releasing the same when oscillated to extreme channel aligned positions, the return movement of the one or the other of said tumblers according to the setting of said shifter head serving to impart gear-shifting movements to the selected rack bar and corresponding gear shift rod.

13. The structure defined in claim 12 in which the gear shift controlling connections to the clutch-actuating mechanism includes a rocker normally holding said tumblers against movement but operative to oscillate said tumblers reversely from their normal positions into releasing positions under final clutch-releasing movement of the clutch-actuating mechanism.

14. The structure defined in claim 12 in which the lug-acting flanges of said tumblers are variably set back so as to impart different extent of movement to different racks and their correspondingly connected gear shift rods.

15. The structure defined in claim 12 in which the lug-acting flanges of said tumblers are variably set back so as to impart different extent of movement to different racks and their correspondingly connected gear shift rods, and an additional escape device comprising elements on said shifter head and on said tumblers arranged to release said shifter head and secondary cam block for movement under the tension of the set spring when and only when said tumblers have been oscillated to extreme channel aligned positions.

16. The combination with the primary gear-shifting elements and clutch of a transmission system, of gear shift controlling mechanism comprising reversely acting tumblers, clutch-actuating mechanism operative also to impart reverse oscillatory movements to said tumblers, a shifter head movable axially on said tumblers, said tumblers having spaced lugs operative alternately on said shifter head under progressive axial adjustments of the latter to impart oscillatory movements thereto in one direction or the other required for progressive gear-shifting actions, said gear shift controlling mechanism further comprising a selecting element arranged to be set while said clutch is in full release, to determine in advance the axial movement and setting of said shifter head.

17. The structure defined in claim 16 in further combination with means movable axially with said shifter head to lock all of the primary gear shift elements except the one subject to said shifter head and to release the primary gear shift element that is subject to said shifter head.

18. The structure defined in claim 16 in which said tumblers in different axial positions of said shifter head impart different extent of oscillatory movement to said primary gear-shifting elements, as required for proper shifting of the transmission gears.

19. The combination with primary gear-shifting elements, the clutch and clutch-actuating device of a transmission mechanism, said gear-shifting elements being mounted for different movements and arranged to accomplish the different gear-shifting functions by movements differing in extent and direction, reversely-acting intermediate actuating elements operative on said primary gear-shifting elements under common movements and arranged to impart thereto the appropriate movements to different extent and in different directions, a selecting element adapted to be set in advance for a subsequent gear-shifting action, and control means whereby under operation of the clutch-actuating device, said intermediate actuating elements will be given common movements and set into action according to the pre-setting of said selecting element.

20. The structure defined in claim 19 in which the primary gear-shifting elements are given movements differing in extent, by the setting of the intermediate actuating elements different normal distances from the primary gear-shifting elements upon which they operate.

21. The combination with primary gear-shifting elements, the clutch and clutch-actuating device of a transmission mechanism, of a controlling mechanism therefor including a selecting element adapted to be set in advance for subsequent gear-shifting action, both while the clutch is engaged and in release, and operative by an intermediate portion of the movement of said clutch-actuating device to cause shifting of the primary gear-shifting elements, and means operative to lock the primary selecting element while the gear-shifting elements are in operation, but to unlock the primary selecting element during the interval between the shifting out of one speed to the shifting in of another speed; in which the primary gear-shifting elements are mounted for different movements and are arranged to accomplish the different gear-shifting functions by movement differing in extent and direction, in which said gear-shifting mechanism further includes reversely-acting intermediate actuating elements operative on said primary gear-shifting elements under common movements and arranged to impart thereto the appropriate movements to different extent and in different direction, and control means whereby under operation of the clutch-actuating device said intermediate actuating elements will be given common movements when set into action according to the predetermined setting of said selecting elements.

22. The combination with primary gear-shifting elements and clutch mechanism of a transmission system, of gear shift controlling mechanism comprising an intermediate gear-shifting element mounted for movement in one direction to select the primary gear-shifting element and mounted for movement in another direction to operate the selected gear-shifting element, a primary selecting element constructed and arranged to be preset for subsequent selecting action on said intermediate gear-shifting element and having connections operative under a clutch manipulation to control the action of said intermediate selecting element, and a positive automatic lock positively locking said primary gear-shifting elements when the gear-shifting mechanism is in neutral, but to release the selected primary gear shift element.

23. In a transmission mechanism, the combination with primary speed change elements mounted for different extent of speed change movements, a clutch, a clutch-actuating device, intermediate actuating elements operative on said primary speed change elements to impart movements of different extent thereto, a selecting element adapted to be set in advance for subsequent speed change action, and control means subject to the action of said clutch-actuating device for actuating said intermediate selecting element in accordance with the presetting of said selecting element.

24. The structure defined in claim 23 in which said intermediate selecting element is in the form of a shifter head mounted for axial movements to select the predetermined primary speed change element and for oscillatory movement to actuate the selected speed change element.

25. The structure defined in claim 23 in which said intermediate selecting element is in the form of a shifter head mounted for axial movements to select the predetermined primary speed change element and for oscillatory movement to actuate the selected speed change element, said shifter head and said primary selecting elements having co-operating contacting surfaces variably spaced to impart the differential movements to the latter.

26. The combination with primary speed change elements and clutch of a transmission mechanism, of an intermediate selecting element in the form of a shifter head mounted for axial movements to select the primary speed change element and for oscillatory movements to actuate the selected primary speed change element, and manually-operated means for imparting the axial selecting movements to said shifter head, in further combination with axially aligned tumblers on which said shifter head is mounted to slide, said tumblers having longitudinal guides permitting the axial movements of said shifter head when aligned, said tumblers and shifter head having co-operating contacting surfaces for imparting operative oscillatory movements to said shifter head, clutch-actuating means arranged to oscillate said tumblers and align their shifter head guides while the clutch is released, and manually-operated means for axially shifting said shifter head, the contacting surfaces of said tumblers and shifter head serving to impart speed change movements, by movements imparted to said tumblers subsequently to the alignment of their guides and selective positioning of said shifter head.

27. The combination with primary gear shift elements and clutch of a transmission mechanism, of an intermediate selecting element in the form of a toothed shifter head mounted for axial movements to select the primary gear-shift element and for oscillatory movements to operate the selected primary gear-shift element, and means including a manually operated lever for imparting axial selecting movements to said shifter head; in further combination with axially aligned tumblers on which said toothed shifter head is mounted to slide, said tumblers having longitudinal guides permitting axial movements of said shifter head when aligned, said tumblers and shifter head having co-operating contacting surfaces for imparting operative oscillatory movements to said shifter head, clutch-actuating means arranged to oscillate said tumblers and align their shifter head guides while the clutch is released, and manually operated means for axially shifting said shifter head, the contacting surfaces for said tumblers and shifter head serving to impart gear change movements, by movements imparted to said tumblers subsequently to the alignment of their guide channels and selective positioning of said shifter head.

28. The combination with primary gear-shifting elements and the clutch of a transmission mechanism, of a primary speed change selector and a shiftable lock for said primary gear-shifting elements arranged to be automatically actuated by said speed-change selector, said lock being constructed and arranged to selectively release said primary gear-shifting elements one at a time and to positively lock all of the primary gear-shifting elements, except the one selected, against movement.

29. The combination with primary speed-change elements, the clutch and clutch-actuating device of a transmission system, of a controlling mechanism therefor including a selecting element, adapted to be set in advance for subsequent speed-change action, and operated by the force created by a portion of the movement of said clutch-actuating device to cause selecting and subsequent change of the speed-change elements, and means operative to positively lock the selecting element against possible operation while the speed-change elements are in operation, but to unlock the selecting element during the interval between the shifting out of one speed to the shifting in of another speed.

30. The combination with primary speed change elements, the clutch and clutch-actuating device of a transmission system, of a controlling mechanism therefor including a selecting element adapted to be set in advance for subsequent speed-change selecting action, manually operated means for pre-setting said selecting element for subsequent selecting action, and power storage means, operated by said clutch-actuating device during a portion of its movement, creating a force to cause said selecting element to complete and carry out the selecting and speed change action.

31. The structure defined in claim 30 in which said selecting element is adapted to be set in advance for subsequent gear-shifting action both while the clutch is engaged and in release.

FRANK C. HIGGINS.